United States Patent
Hirata et al.

(10) Patent No.: US 10,455,371 B2
(45) Date of Patent: Oct. 22, 2019

(54) COMMUNICATION PROCESSING SYSTEM, GROUP MESSAGE PROCESSING METHOD, COMMUNICATION PROCESSING APPARATUS, AND CONTROL METHOD AND CONTROL PROGRAM OF COMMUNICATION PROCESSING APPARATUS

(71) Applicant: NEC CORPORATION, Tokyo (JP)

(72) Inventors: Kyoji Hirata, Tokyo (JP); Toru Yamada, Tokyo (JP); Akira Kamei, Tokyo (JP); Hotaka Sugano, Tokyo (JP); Masahiro Serizawa, Tokyo (JP); Satoshi Hasegawa, Tokyo (JP); Masashi Shimoma, Tokyo (JP); Yumiko Okuyama, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/762,838

(22) PCT Filed: Aug. 26, 2016

(86) PCT No.: PCT/JP2016/075074
§ 371 (c)(1),
(2) Date: Mar. 23, 2018

(87) PCT Pub. No.: WO2017/051665
PCT Pub. Date: Mar. 30, 2017

(65) Prior Publication Data
US 2018/0279090 A1 Sep. 27, 2018

(30) Foreign Application Priority Data
Sep. 24, 2015 (JP) ................. 2015-186304

(51) Int. Cl.
*H04W 4/06* (2009.01)
*H04W 4/70* (2018.01)

(52) U.S. Cl.
CPC ................ *H04W 4/06* (2013.01); *H04W 4/70* (2018.02)

(58) Field of Classification Search
None
See application file for complete search history.

(56) References Cited

U.S. PATENT DOCUMENTS 9,191,806 B2 * 11/2015 Kim ................. H04W 4/70
2012/0134329 A1 * 5/2012 Lim .................. H04L 1/1854
370/329

(Continued)

FOREIGN PATENT DOCUMENTS

| JP | 2009-212796 A | 9/2009 |
|---|---|---|
| WO | 2014/068143 A1 | 5/2014 |
| WO | 2014/109168 A2 | 7/2014 |

OTHER PUBLICATIONS

"3rd Generation Partnership Project; Technical Specification Group Services and System Aspects; System improvements for Machine-Type Communications (MTC) (Release 11)", 3GPP TR 23.888 V11.0.0, Sep. 2012, 165 pages.

(Continued)

*Primary Examiner* — Brian S Roberts
(74) *Attorney, Agent, or Firm* — Sughrue Mion, PLLC

(57) ABSTRACT

A system of this invention is directed to a communication processing system that suppresses an increase in number of control messages even if devices cannot receive a group message. The communication processing system includes a holder that holds identifiers of a plurality of devices included in a device group as a target of a group messaging requested from an application, an unreached-device list acquirer that acquires an unreached-device list created by excluding, (Continued)

identifiers of devices which the group message has reached from the identifiers held in the holder based on responses to delivery of the group message, and a message deliverer that delivers a message based on the group messaging to devices having identifiers included in the unreached-device list.

19 Claims, 15 Drawing Sheets

(56) References Cited

U.S. PATENT DOCUMENTS

| | | | | |
|---|---|---|---|---|
| 2013/0155954 A1* | 6/2013 | Wang | ............ | H04W 4/70 370/328 |
| 2013/0196704 A1* | 8/2013 | Jain | ............ | H04W 4/70 455/518 |
| 2015/0319172 A1* | 11/2015 | Zhang | ............ | H04L 63/065 713/169 |
| 2015/0358816 A1* | 12/2015 | Zhang | ............ | H04W 12/06 726/12 |
| 2018/0007614 A1* | 1/2018 | Velev | ............ | H04W 48/06 |

OTHER PUBLICATIONS

"3rd Generation Partnership Project; Technical Specification Group Services and System Aspects; Study on Machine-Type and other mobile data applications Communications enhancements (Release 12)", 3GPP TR 23.887 V2.0.0, Dec. 2013, 152 pages.

International Search Report for PCT/JP2016/075074, dated Nov. 8, 2016.

* cited by examiner

Figure 8.1.3.2.1.1-2 : Procedure flows MBMS based group messaging option 1 (3GPP TS 23.887 V12.0.0 (2013.12))

Figure 8.1.3.2.1.1-1 : MBMS based group messaging architecture option 1 (3GPP TS 23.887 V12.0.0 (2013.12))

| GROUP MESSAGE ID | MTC DEVICE ID | REACHED/UNREACHED FLAG | UNREACHED DEVICE ID LIST |
|---|---|---|---|
| | | ○ | |
| | | ○ | |
| | | × | |
| | | × | |
| | | × | |
| | | ○ | |
| ... | ... | | |
| | ... | | |

FIG. 5

| GROUP MESSAGE ID | MTC DEVICE ID | REACHED/UNREACHED FLAG | UNREACHED-DEVICE ID LIST | REACHED-DEVICE ID LIST |
|---|---|---|---|---|
| | | ○ | | |
| | | ○ | | |
| | | × | | |
| | | × | | |
| | | × | | |
| | | ○ | | |
| | ... | | | |
| ... | ... | | | |

FIG. 13

COMMUNICATION PROCESSING SYSTEM, GROUP MESSAGE PROCESSING METHOD, COMMUNICATION PROCESSING APPARATUS, AND CONTROL METHOD AND CONTROL PROGRAM OF COMMUNICATION PROCESSING APPARATUS

CROSS REFERENCE TO RELATED APPLICATIONS

This application is a National Stage of International Application No. PCT/JP2016/075074 filed Aug. 26, 2016, based upon and claims the benefit of priority from Japanese patent application No. 2015-186304, filed on Sep. 24, 2015, the disclosure of which is incorporated herein in its entirety by reference.

TECHNICAL FIELD

The present invention relates to a communication processing system, a group message processing method, a communication processing apparatus, and a control method and control program of the communication processing apparatus.

BACKGROUND ART

In an IoT (Internet of Things) system, it is necessary to exchange data with an enormous number of MTC (Machine Type Communication) devices connected to the network. Therefore, it is required to reduce the number of data messages from an enormous number of MTC devices or the number of control messages to an enormous number of MTC devices. To achieve this, a method of collectively transmitting messages to MTC devices regionally or constitutionally belonging to the same group is being examined. Non-patent literature 1 (TR 23.888) describes a technique of reducing the number of messages exchanged with MTC devices, avoiding network congestion, and saving resources by grouping devices in the same area or devices having the same function to collectively transmit messages to the same group.

Non-patent literature 2 (TR 23.887) describes some methods as group messaging methods. More specifically, a method of using a CBC (Cell Broadcast Center) and a CBS (Cell Broadcast Service), a method of using an MBMS (Multimedia Broadcast and Multicast Service), and a method of using IP (Internet Protocol) multicast are described. A group message from an SCS (Service Capability Server) is transmitted to MTC devices. If the MTC device cannot receive the group message for some reason such as a temporal failure of a wireless access network, the SCS is notified of it (action in response to group messaging), and executes processing such as retransmission, as needed.

CITATION LIST

Non-Patent Literature

Non-patent literature 1: 3GPP TR 23.888 V11.0.0 (2012-09)
Non-patent literature 2: 3GPP TR 23.887 V12.0.0 (2013-12)

SUMMARY OF THE INVENTION

Technical Problem

In the methods described in the above patent literatures, however, if some MTC devices cannot receive the group message due to a temporary failure of a wireless access network or the like, group messaging processing is performed again for the same group. Alternatively, it is necessary to perform, for example, processing of retransmitting a message by issuing, by the SCS, a transmission request to the MTC devices that cannot receive the message, thereby unwantedly increasing the number of messages and the number of control messages to the MTC devices.

The present invention enables to provide a technique of solving the above-described problem.

Solution to Problem

One example aspect of the present invention provides a communication processing apparatus comprising:

a holder that holds identifiers of a plurality of devices included in a device group as a target of a group messaging requested from an application;

an unreached-device list acquirer that acquires an unreached-device list created by excluding, identifiers of devices which a group message has reached from the identifiers held in said holder, based on responses to delivery of the group message; and a message deliverer that delivers a message based on the group messaging to devices having identifiers included in the unreached-device list.

Another example aspect of the present invention provides a method of controlling a communication processing apparatus, comprising:

holding, in a holder, identifiers of a plurality of devices included in a device group as a target of a group messaging requested from an application;

acquiring an unreached-device list created by excluding identifiers of devices which a group message has reached from the identifiers held in the holder, based on responses to delivery of the group message; and delivering a message based on the group messaging to devices having identifiers included in the unreached-device list.

Still other example aspect of the present invention provides a program of controlling a communication processing apparatus for causing a computer to execute a method, comprising:

holding, in a holder, identifiers of a plurality of devices included in a device group as a target of a group messaging requested from an application;

acquiring an unreached-device list created by excluding identifiers of devices which a group message has reached from the identifiers held in the holder, based on responses to delivery of the group message; and delivering a message based on the group messaging to devices having identifiers included in the unreached-device list.

Still other example aspect of the present invention provides a communication processing system comprising:

a holder that holds identifiers of a plurality of devices included in a device group as a target of a group messaging requested from an application;

an unreached-device list generator that acquires a plurality of devices which a group message has reached based on responses of devices to delivery of the group message, and generates an unreached-device list by excluding the identifiers of the plurality of reached devices from the identifiers held in the holder; and a message deliverer that delivers a message based on the group messaging to devices having identifiers included in the unreached-device list.

Still other example aspect of the present invention provides a group message processing method comprising:

holding, in a holder, identifiers of a plurality of devices included in a device group as a target of a group messaging requested from an application;

acquiring a plurality of devices which a group message has reached based on responses of devices to delivery of the group message, and generating an unreached-device list by excluding the identifiers of the plurality of reached devices from the identifiers held in the holder; and delivering a message based on the group messaging to devices having identifiers included in the unreached-device list.

Advantageous Effects of Invention

According to the present invention, it is possible to suppress an increase in number of control messages even if devices cannot receive a group message.

BRIEF DESCRIPTION OF DRAWINGS

FIG. 5 is a table showing the structure of a group message database according to the second example embodiment of the present invention;

FIG. 13 is a table showing the structure of a group message database according to the fourth example embodiment of the present invention.

DESCRIPTION OF EXAMPLE EMBODIMENTS

Example embodiments of the present invention will now be described in detail with reference to the drawings. It should be noted that the relative arrangement of the components, the numerical expressions and numerical values set forth in these example embodiments do not limit the scope of the present invention unless it is specifically stated otherwise.

First Example Embodiment

A communication processing apparatus 100 according to the first example embodiment of the present invention will be described with reference to FIG. 1. The communication processing apparatus 100 is an apparatus that performs message transmission/reception processing between an application and a device group.

Figure 1:
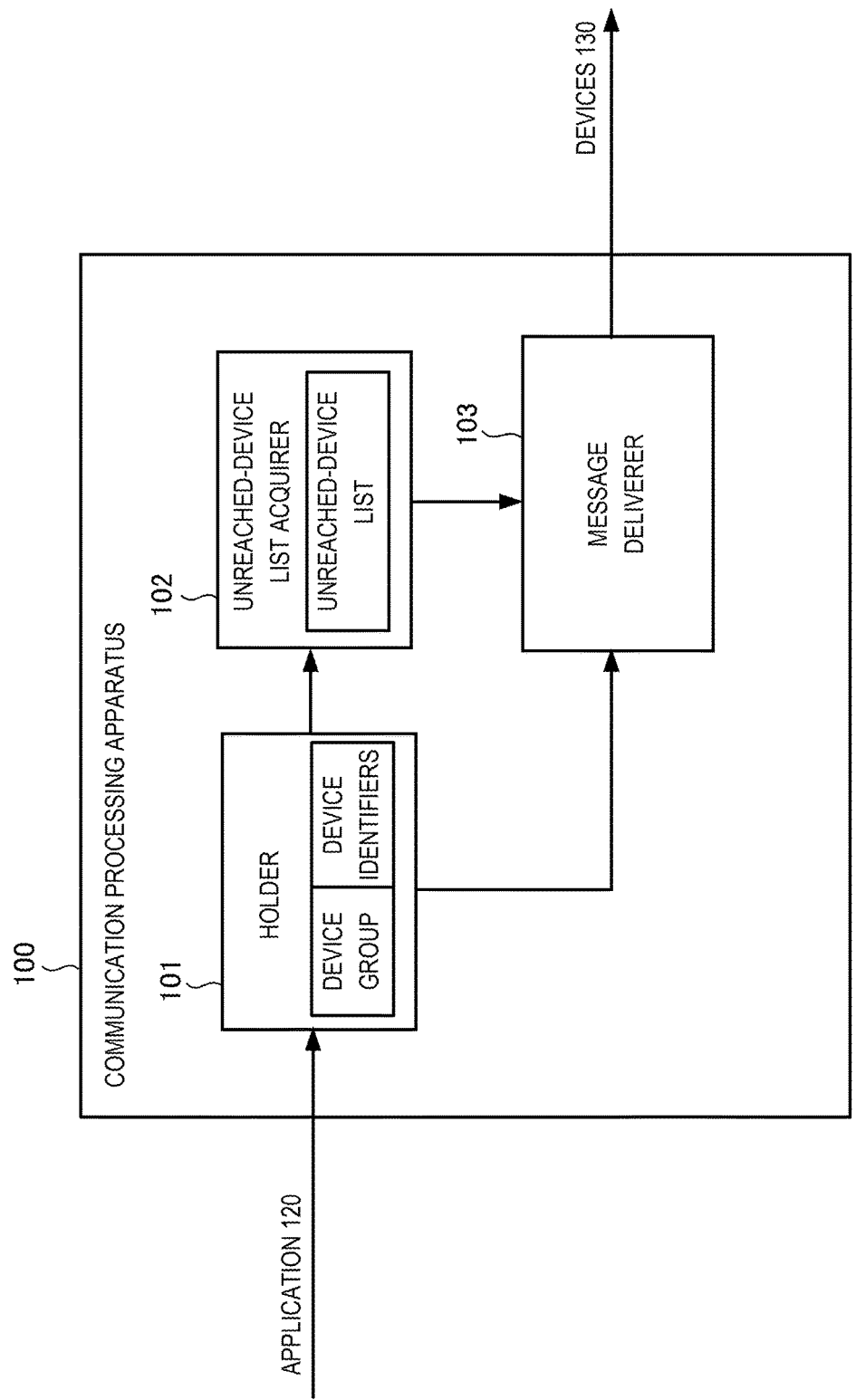
FIG. 1 is a block diagram showing the arrangement of a communication processing apparatus according to the first example embodiment of the present invention.

As shown in FIG. 1, the communication processing apparatus 100 includes a holder 101, an unreached-device list acquirer 102, and a message deliverer 103. The holder 101 holds identifiers of a plurality of devices included in a device group as a target of a group messaging requested from an application 120. The unreached-device list acquirer 102 acquires an unreached-device list created by excluding identifiers of devices which the group message has reached from the identifiers held in the holder 101, based on responses to delivery of the group message. The message deliverer 103 delivers a message based on the group messaging to devices having identifiers included in the unreached-device list.

According to this example embodiment, since a message is delivered to a group of devices which a group message has not reached, even if devices cannot receive the group message, it is possible to suppress an increase in number of control messages.

Second Example Embodiment

A communication processing system including an MTC-IWF (Machine Type Communication-Interworking Function) serving as a communication processing apparatus according to the second example embodiment of the present invention will be described next. The MTC-IWF corresponding to the communication processing apparatus according to this example embodiment receives, from an application, a request to collectively transmit a group message to a device group, and transmits the group message. After that, the MTC-IWF acquires, by a response message, that the message has not reached (to be also referred to as "unreached" hereinafter) devices in the group. If there are message unreached devices, the MTC-IWF creates an unreached-device group list of the devices, and collectively retransmits the message to the unreached-device group. This can significantly suppress an increase in number of control messages and reduce communication network congestion, as compared with a conventional case in which if there are message unreached devices, an SCS or the like retransmits the group message.

<<Technical Premise>>

Figure 8:
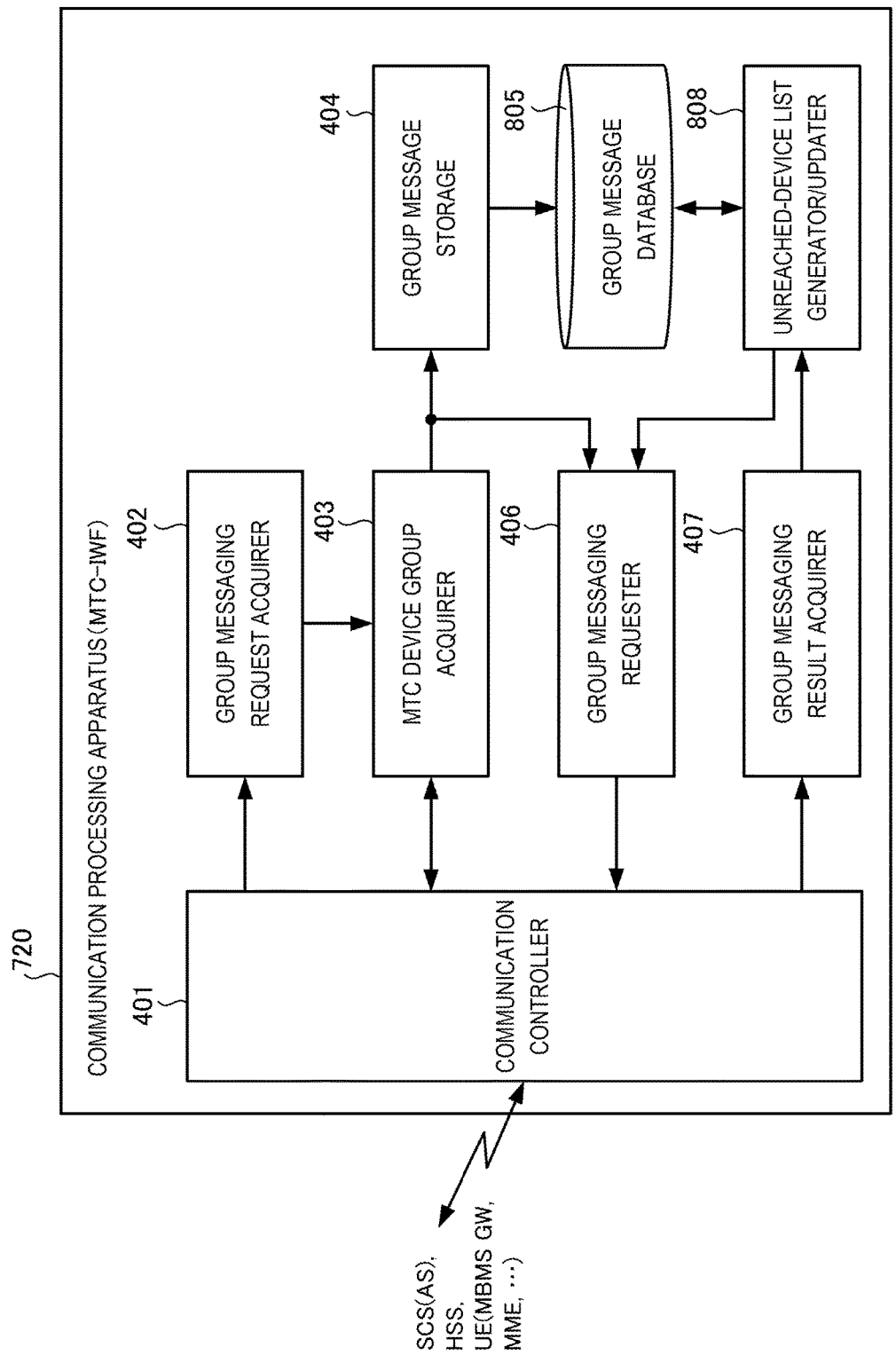
FIG. 8 is a block diagram showing the functional arrangement of the MTC-IWF serving as the communication processing apparatus according to the third example embodiment of the present invention.

The operation sequence of an MTC-IWF defined by 3GPP (Third Generation Partnership Project) TS 23.887 according to the technical premise will be described with reference to FIG. 2B. In FIG. 2B, FIG. 8.1.3.2.1.1-2 shows a group messaging procedure using the MBMS. Upon receiving a group messaging request from an external AS (Application Server), an SCS (Service Capability Server) sends the group messaging request to the MTC-IWF in a 3GPP core network.

The group messaging request includes: 1) application layer data; 2) a group identifier such as an external group identifier; and 3) optionally, the location/area and RAT (Radio Access Technology) of a group messaging delivery destination.

Upon receiving the group messaging request from the SCS, the MTC-IWF checks whether group messaging by the SCS is authorized. More specifically, the MTC-IWF sends a subscriber information request including an external group ID and SCS ID to an HSS/HLR (Home Subscriber Server/Home Location Register). This is done to confirm whether group messaging to a specific group by the SCS is authorized and obtain subscription information for the specific group. The HSS/HLR returns, to the MTC-IWF, as a subscriber information response, a message delivery method such as the CBS or MBMS based on subscription information and a preset policy. Note that if group messaging by the SCS is not authorized or the subscription information is invalid, the MTC-IWF transmits, to the SCS, a group messaging confirmation response displaying the reason, and then stops the group messaging procedure; otherwise, the procedure advances.

The MTC-IWF selects a delivery method such as the CBS, MBMS, or core network based on the preset policy and the information received from the HSS/HLR. If the MTC-IWF selects the MBMS, it transmits, to a BM-SC/MBMS-GW (Broadcast Multimedia-Service Center/MBMS-Gateway), a session start request including MBMS service area information. Upon receiving this request, the MBMS-GW performs a session start procedure with an MME/SGSN, thereby establishing connection to MTC devices. After that, the MTC-IWF starts to transmit application layer data. However, for further optimization, the session start request may include the application layer data.

Subsequently, a group message from the SCS is transmitted to the MTC devices. Note that if the MTC device cannot receive the group message for some reason such as a temporal failure of a wireless access network, the SCS is notified of it ("action in response to group messaging"), and executes processing such as retransmission, as needed.

<<Outline of this Example Embodiment>>

In this example embodiment, a group message and transmission target device information (group message transmission ID list), which have been acquired by a group messaging request from the SCS, are held in the MTC-IWF.

Upon receiving the group message, the MTC device transmits, to the MTC-IWF via an MME, response information to the group message. Based on a group message target list saved in the MTC-IWF and a group message reaching status from the MTC devices, the MTC-IWF creates a group to which the group message is to be retransmitted. As an example, a group list (MTC device ID list) acquired from the HSS is collated with MTC device IDs extracted from the response messages received via the MME, and a mark is assigned to the matching MTC device ID (the ID may be simply deleted from the list). By deleting, from the group list acquired from the HSS, the MTC device IDs assigned with the marks based on the responses from the MTC devices after a predetermined time elapses since the first group messaging, it is possible to create a group message unreached-device ID list. Alternatively, the MTC-IWF may create a list of the IDs of the MTC devices that have returned responses, and collectively collate the created list with the group list, thereby creating a group message unreached-device ID list.

The group message saved in the MTC-IWF is retransmitted using the thus created group message unreached group list. This can reliably transmit the message to necessary terminals without increasing the total number of messages by transmitting messages between the SCS and the MTC-IWF, control messages for authentication, and the message to terminals to which the message has already been transmitted.

<<Operation Sequence>>

Figure 2A:
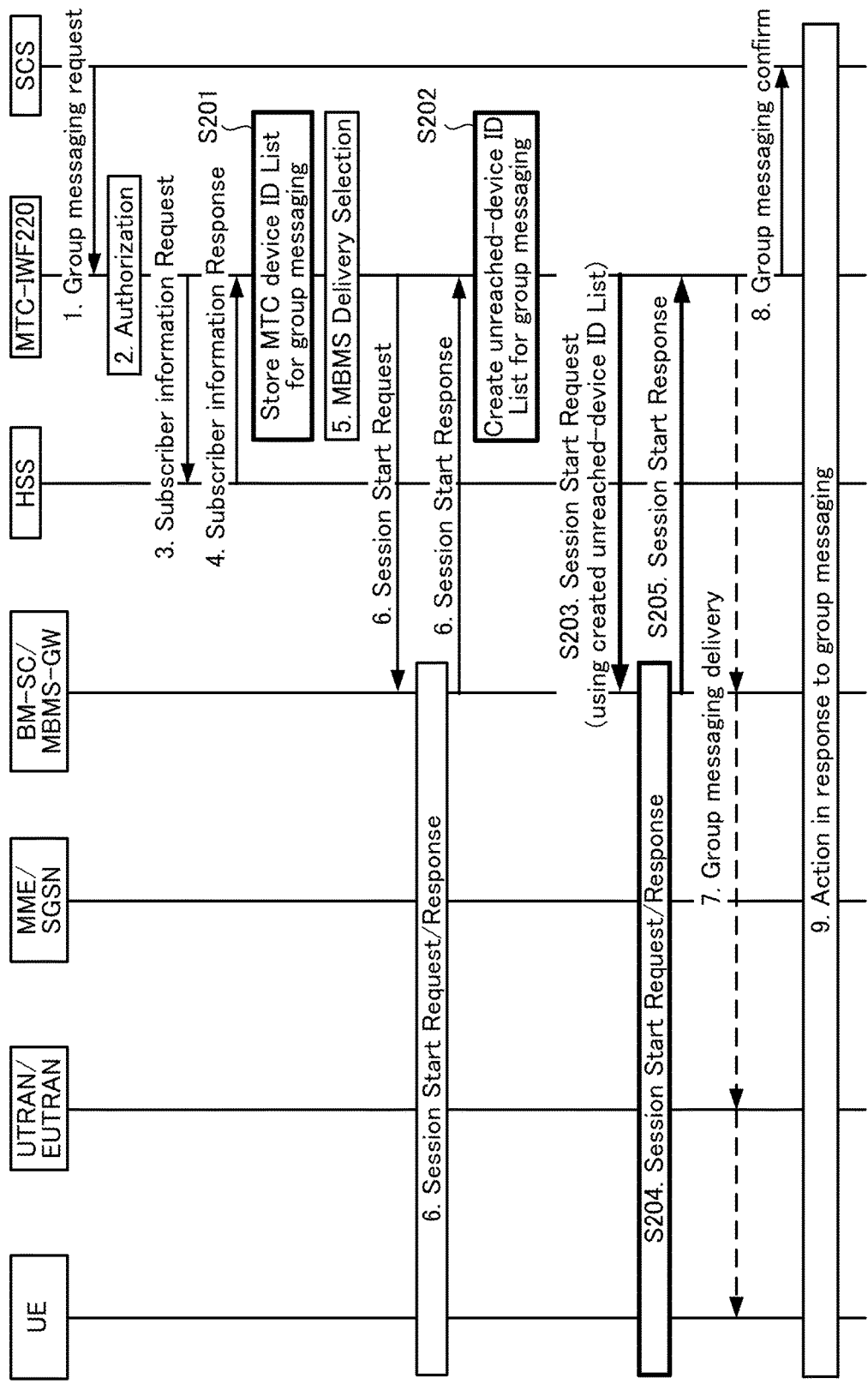
FIG. 2A is a sequence chart showing the operation of an MTC-IWF serving as a communication processing apparatus according to the second example embodiment of the present invention.
Figure 2B:
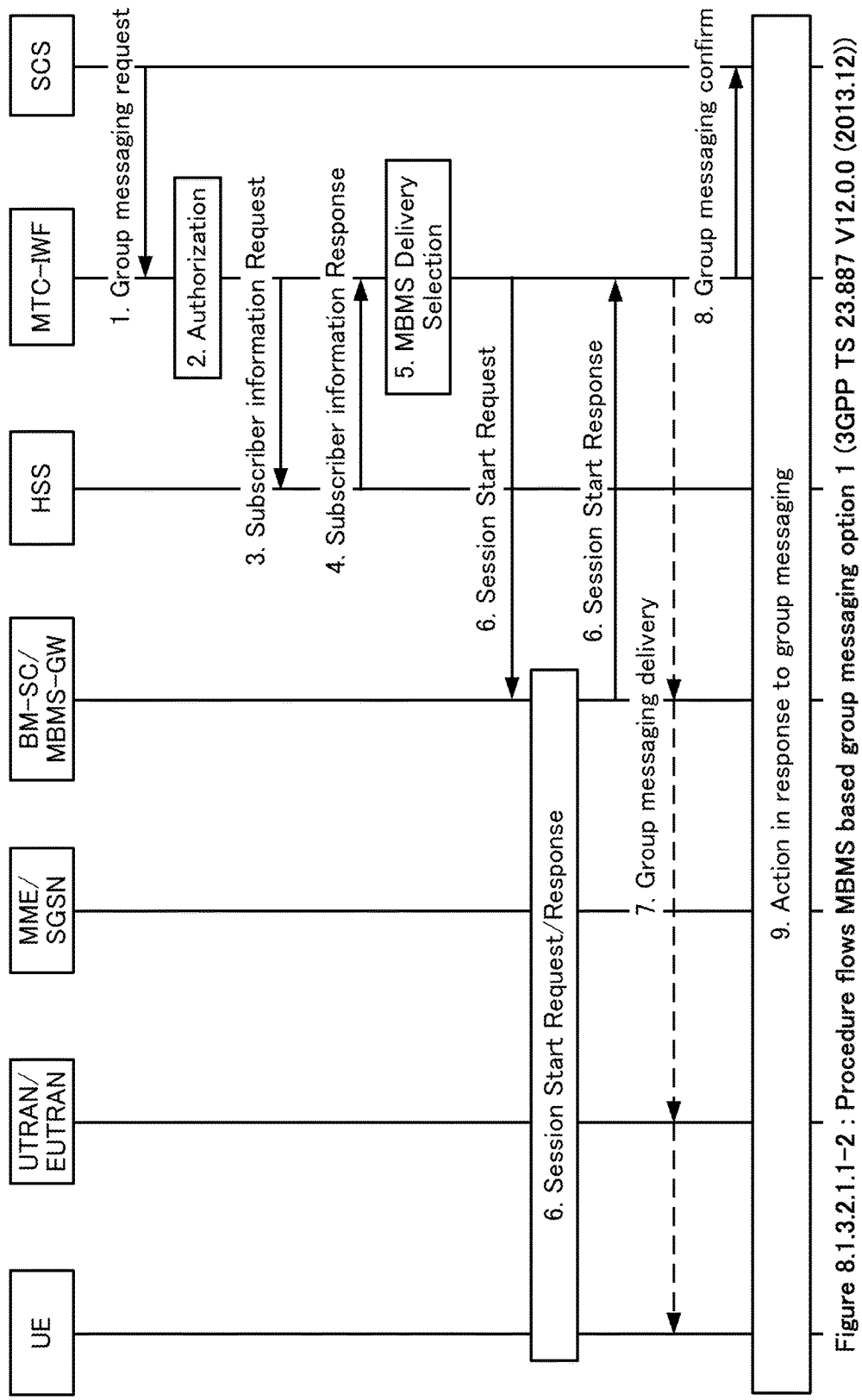
FIG. 2B is a sequence chart showing the operation of an MTC-IWF defined by 3GPP TS 23.887 according to a technical premise.

FIG. 2A is a sequence chart showing the operation of an MTC-IWF 220 serving as the communication processing apparatus according to this example embodiment. Note that in FIG. 2A, the same numbers as those in FIG. 2B of the technical premise indicate the same sequence operations, and a repetitive description thereof will be omitted. In this example embodiment, changed or added sequence operations are added with step numbers, and will be described below. This is the group message processing method for the communication processing system serving as the core network including the MTC-IWF 220.

In step S201, the MTC-IWF 220 holds or saves a group messaging target MTC device ID list based on MTC device information acquired from the HSS.

After selecting the MBMS and sending a session start request, the MTC-IWF 220 extracts, in step S202, MTC devices that have not responded based on response messages from the MME and the like, thereby generating an unreached-device ID list. In step S203, the MTC-IWF 220 re-executes the session start request based on the unreached-device ID list.

The MTC-IWF 220 receives, by a response message in step S205, the result of session start processing between the MBMS-GW and a UE (User Equipment) in step S204, and executes group messaging delivery.

<<System Configuration>>

Figure 3:
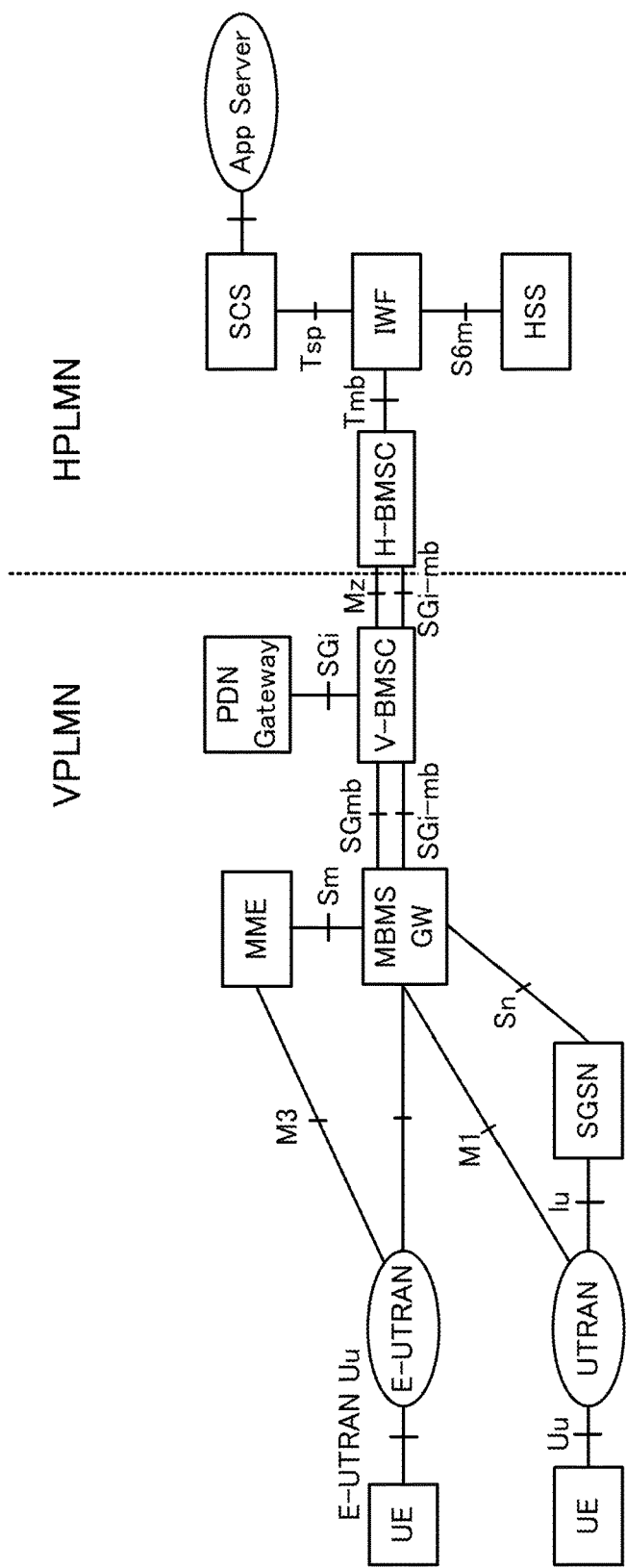
FIG. 3 is a block diagram showing the configuration of a communication processing system including the MTC-IWF serving as the communication processing apparatus according to the second example embodiment of the present invention.

FIG. 3 is a block diagram showing the configuration of a communication processing system including the MTC-IWF 220 serving as the communication processing apparatus according to this example embodiment. Note that FIG. 3 shows an MBMS-based group messaging architecture shown in FIG. 8.1.3.2.1.1-1 of 3GPP TS 23.887 V12.0.0 (2013.12), and a detailed description of components will be omitted.

<<Functional Arrangement of MTC-IWF>>

Figure 4:
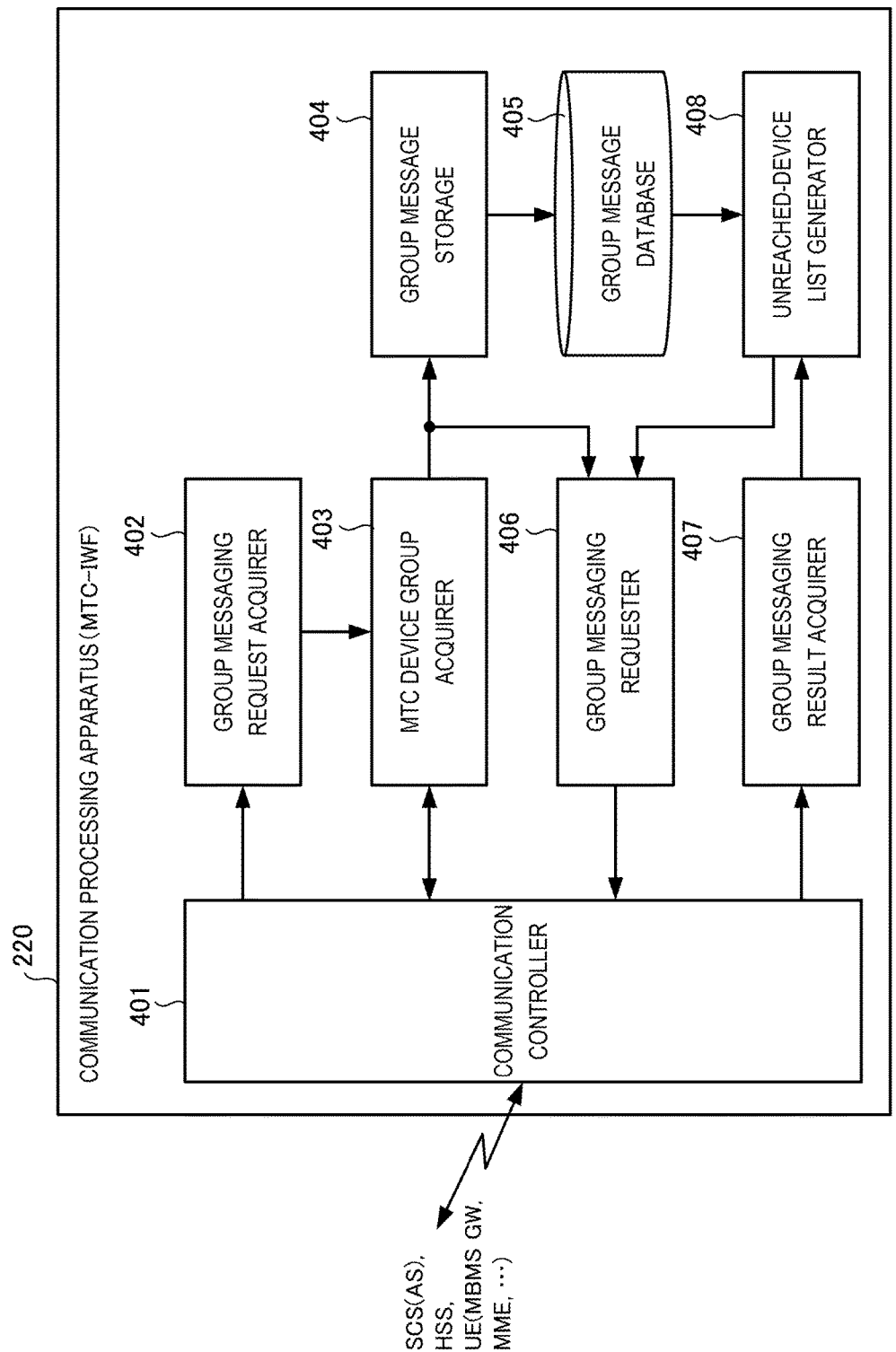
FIG. 4 is a block diagram showing the functional arrangement of the MTC-IWF serving as the communication processing apparatus according to the second example embodiment of the present invention.

FIG. 4 is a block diagram showing the functional arrangement of the MTC-IWF 220 serving as the communication processing apparatus according to this example embodiment.

The MTC-IWF 220 includes a communication controller 401, a group messaging request acquirer 402, an MTC device group acquirer 403, a group message storage 404, a group message database 405, a group messaging requester 406, a group messaging result acquirer 407, and an unreached-device list generator 408.

The communication controller 401 controls communication of the MTC-IWF 220 with an AS (Application Server)

via the SCS, with the HSS, and with an UE 210 via an MB-SC, MBMS, GW, MME, and the like. The group messaging request acquirer 402 acquires a group messaging request from the SCS. Based on the group messaging request, the MTC device group acquirer 403 acquires, from the HSS/HLR, information of an MTC device group to which a group message is to be transmitted. The group message storage 404 stores, in the group message database 405, the group message and the information of the MTC device group acquired by the MTC device group acquirer 403. In accordance with an instruction of the group message storage 404, the group message database 405 holds the group message and the information of the MTC device group to be searchable.

The group messaging requester 406 sends a session start processing request or group messaging request to the MTC device group acquired by the MTC device group acquirer 403 or an MTC device group of an unreached-device list generated by the unreached-device list generator 408. The group messaging result acquirer 407 acquires, from the BM-SC, a result of the session start processing request sent from the group messaging requester 406 to the UE or a group messaging result. Based on the result of the session start processing request acquired by the group messaging result acquirer 407, the unreached-device list generator 408 generates an unreached-device ID list by MTC devices which the message has not reached.

Note that in FIG. 4, the MTC-IWF 220 includes the unreached-device list generator 408. However, the unreached-device list generator 408 may be included in an external apparatus or may serve as an unreached-device list acquirer.

(Group Message Database)

FIG. 5 is a table showing the structure of the group message database 405 according to this example embodiment. Note that the structure of the group message database 405 is not limited to that shown in FIG. 5.

The group message database 405 stores MTC device IDs 502 included in a transmission target MTC device group in association with a group message ID 501 for which a transmission request has been issued. The group message database 405 stores, for each MTC device ID 502, a flag 503 that indicates whether a message has reached and has been acquired based on the group messaging result, and an unreached-device ID list 504 based on the flag 503, that has been generated by the unreached-device list generator 408.

<<Processing Procedure by MTC-IWF>>

Figure 6:
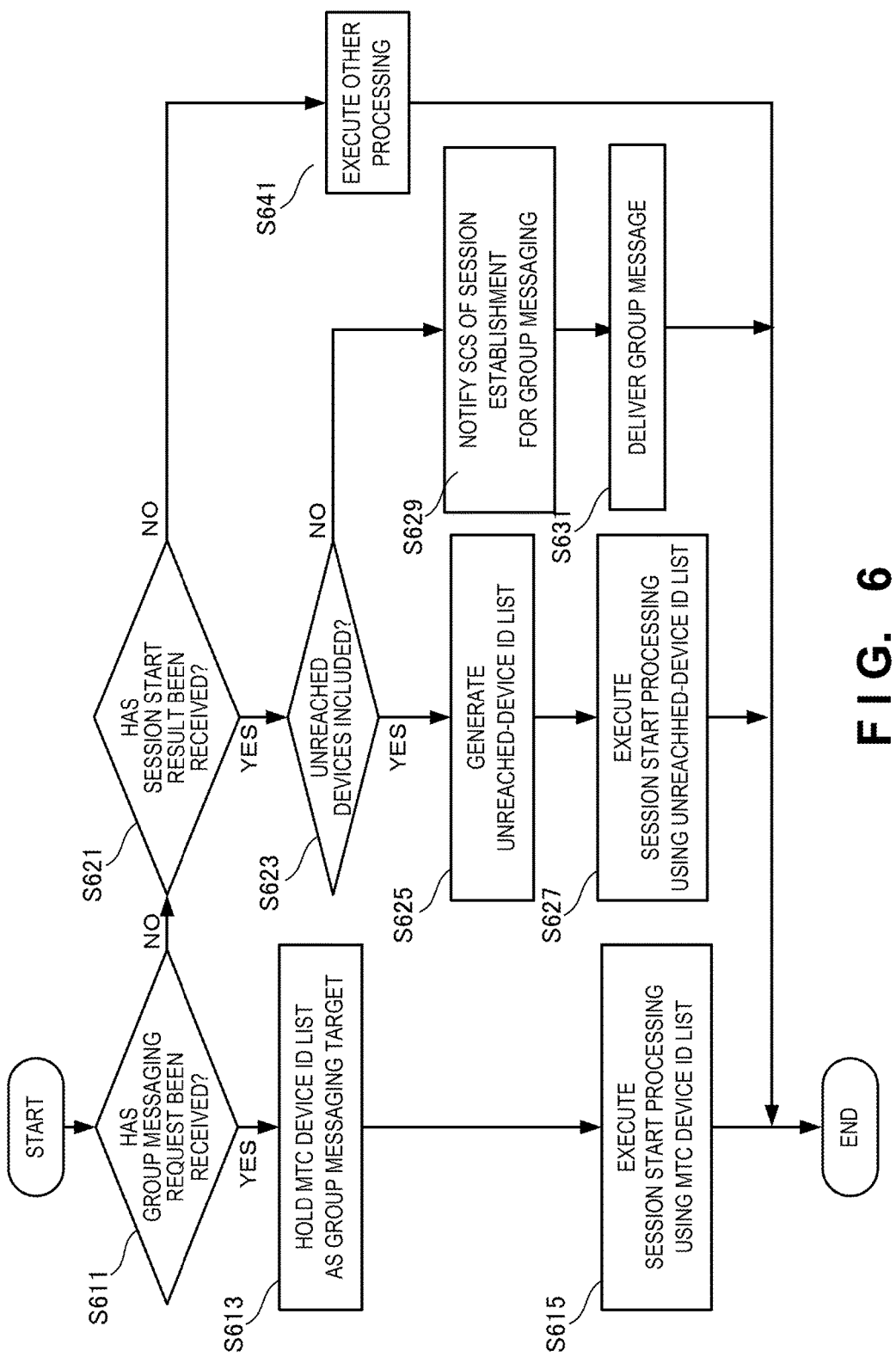
FIG. 6 is a flowchart illustrating a processing procedure by the MTC-IWF serving as the communication processing apparatus according to the second example embodiment of the present invention.

FIG. 6 is a flowchart illustrating a processing procedure by the MTC-IWF 220 serving as the communication processing apparatus according to this example embodiment. This flowchart is executed by a CPU (Central Processing Unit), that controls the core network including the MTC-IWF 220, using a storage medium, thereby implementing the functional components shown in FIG. 4.

In step S611, the MTC-IWF 220 determines whether a group messaging request has been received from the SCS. If the group messaging request has been received from the SCS, the MTC-IWF 220 holds, in step S613, MTC device ID list acquired from the HSS or the like, as a target of the group messaging. In step S615, the MTC-IWF 220 executes session start processing for the MTC device group of the MTC device ID list.

If no group messaging request has been received from the SCS, the MTC-IWF 220 determines in step S621 whether a session start processing response message has been received. If the session start processing response message has been received, the MTC-IWF 220 determines in step S623 whether the session start processing response message includes unreached devices. If the response message includes unreached devices, the MTC-IWF 220 generates, in step S625, an unreached-device ID list of the unreached devices. In step S627, the MTC-IWF 220 executes session start processing for the MTC device group of the unreached-device ID list.

On the other hand, if the response message includes no unreached devices, the MTC-IWF 220 notifies, in step S629, the SCS of session establishment for the group messaging. In step S631, the MTC-IWF 220 executes group message delivery processing. Note that in the second or subsequent processing, even if a response message includes unreached devices, group message delivery processing may be executed.

If no group messaging request has been received from the SCS and the response message includes no unreached devices, the MTC-IWF 220 executes other processing in step S641. Note that the other processing includes processing of a response message of group message delivery processing and a group message retransmission request from the SCS based on the response message.

According to this example embodiment, since a message is delivered to a group of devices which a group message has not reached, even if devices cannot receive the group message, it is possible to suppress an increase in number of control messages. Especially, it is possible to reliably deliver the message to necessary terminal without increasing the total number of messages by delivering messages between the SCS and the MTC-IWF, control messages for authentication, and the message to terminals to which the message has already been delivered.

Third Example Embodiment

A communication processing system including an MTC-IWF serving as a communication processing apparatus according to the third example embodiment of the present invention will be described next. The MTC-IWF serving as the communication processing apparatus according to this example embodiment is different from that according to the second example embodiment in that a session start is repeated while updating an unreached-device ID list. That is, based on a group unreached-device ID list created in the second example embodiment, the group unreached-device ID list is updated in accordance with responses from MTC devices when retransmitting a message, and then the MTC-IWF transmits the group message again. By repeating this procedure a predetermined number of times, it is possible to reduce the number of message unreached devices. The repetition count may be a count preset by a network administrator or the like, or may be determined based on a ratio of group message unreached-device IDs. The remaining components and operations are the same as those in the second example embodiment. Hence, the same reference numerals denote the same components and operations, and a detailed description thereof will be omitted.

<<Operation Sequence>>

Figure 7:
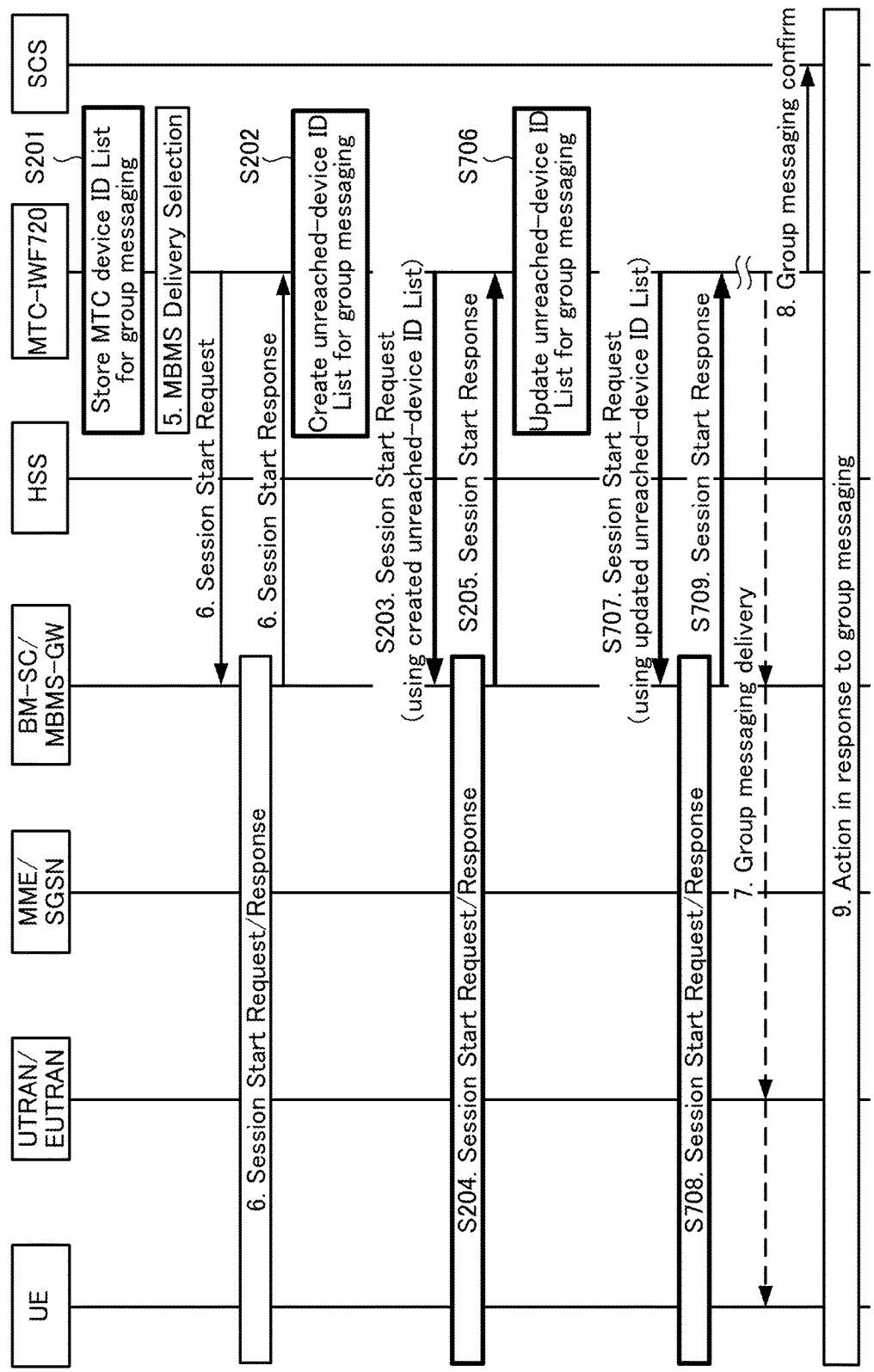
FIG. 7 is a sequence chart showing the operation of an MTC-IWF serving as a communication processing apparatus according to the third example embodiment of the present invention.

FIG. 7 is a sequence chart showing the operation of an MTC-IWF 720 serving as the communication processing apparatus according to this example embodiment. Note that in FIG. 7, the same numbers as those in FIG. 2A and FIG. 2B of the technical premise indicate the same sequence operations, and a repetitive description thereof will be omitted. In this example embodiment, changed or added sequence operations are added with step numbers, and will be described below.

In step S205, a response message obtained when the second session start processing based on the unreached-device ID list is executed is received. In step S706, the MTC-IWF 720 further acquires unreached devices from the response message, and updates the unreached-device ID list. Note that reachable devices may be deleted from the unreached-device ID list.

In step S707, the MTC-IWF 720 executes session start processing based on the updated unreached-device ID list (S708). In step S709, a response message obtained when the third session start processing based on the unreached-device ID list is executed is received, and the MTC-IWF 720 further acquires unreached devices from the response message, and updates the unreached-device ID list (not shown). This update processing is repeated a predetermined number of times to reduce the number of message unreached devices.

<<Functional Arrangement of MTC-IWF>>

FIG. 8 is a block diagram showing the functional arrangement of the MTC-IWF 720 serving as the communication processing apparatus according to this example embodiment. Note that in FIG. 8, the same reference numerals as those in FIG. 4 denote the same functional components and a repetitive description thereof will be omitted.

The MTC-IWF 720 includes a group message database 805 and an unreached-device list generator/updater 808. The group message database 805 stores an unreached-device ID list generated and updated by the unreached-device list generator/updater 808. The unreached-device list generator/updater 808 serves as an unreached-device list generator and an unreached-device list updater to generate an unreached-device ID list based on the response message of the first session start processing and update the unreached-device ID list based on the response message of the second or subsequent session start processing. If the upper limit of the repetition count is reached, the unreached-device list generator/updater 808 requests a group messaging requester 406 to perform session start processing or group message delivery.

Note that in FIG. 8, the unreached-device list generator/updater 808 is included in the MTC-IWF 720. However, the unreached-device list generator or unreached-device list updater may be included in an external apparatus, and the unreached-device list generator may serve as an unreached-device list acquirer.

(Group Message Database)

Figure 9:
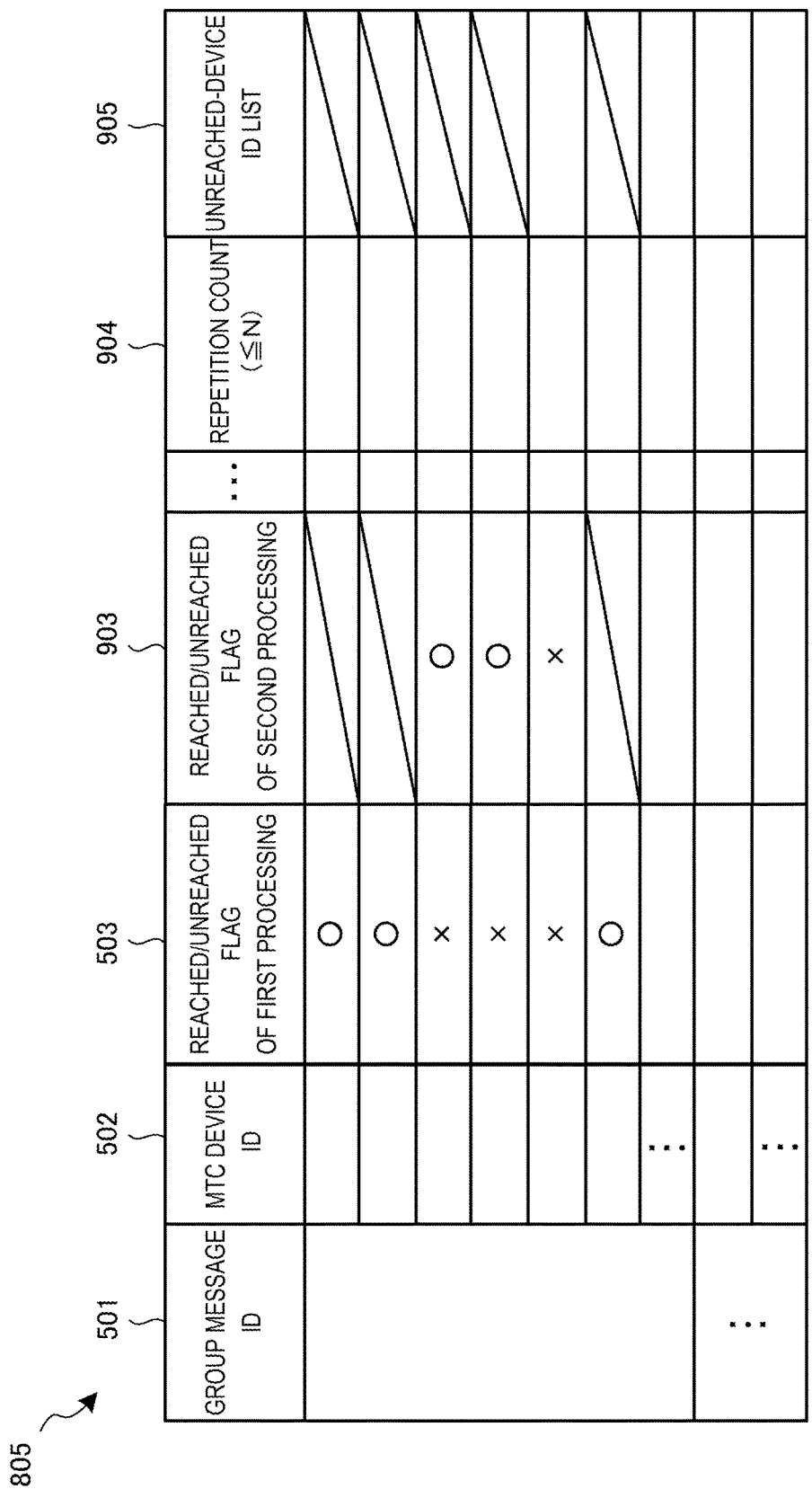
FIG. 9 is a table showing the structure of a group message database according to the third example embodiment of the present invention.

FIG. 9 is a table showing the structure of the group message database 805 according to this example embodiment. Note that in FIG. 9, the same reference numerals as those in FIG. 5 denote the same components and a repetitive description thereof will be omitted.

The group message database 805 stores a reached/unreached flag 903 of the second or subsequent processing, a repetition count 904 of the session start processing, that is equal to or smaller than an upper limit value N, and an unreached-device ID list 905 that is updated every time the session start processing is repeated.

<<Processing Procedure by MTC-IWF>>

Figure 10:
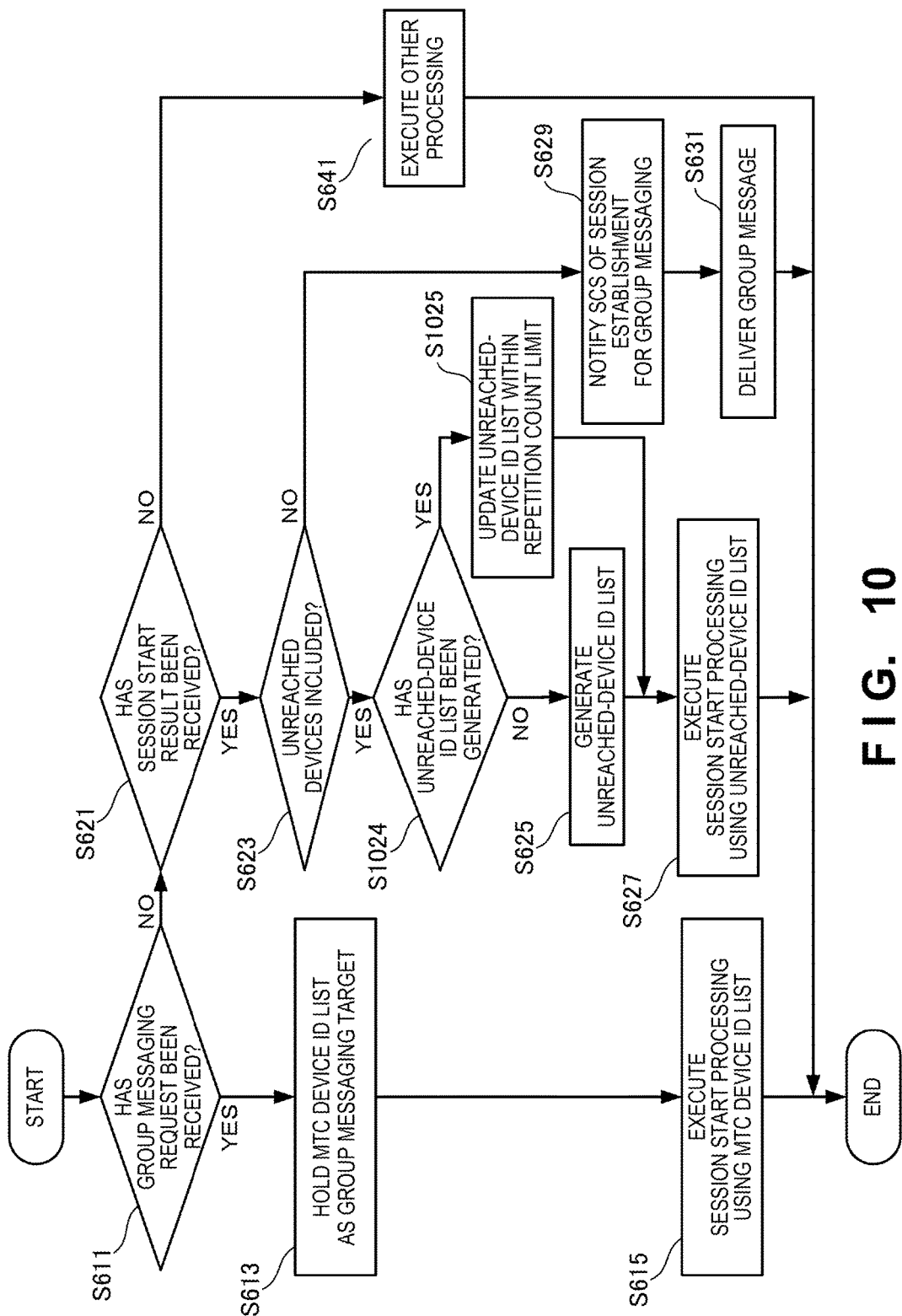
FIG. 10 is a flowchart illustrating a processing procedure by the MTC-IWF serving as the communication processing apparatus according to the third example embodiment of the present invention.

FIG. 10 is a flowchart illustrating a processing procedure by the MTC-IWF 720 serving as the communication processing apparatus according to this example embodiment. Note that in FIG. 10, the same step numbers as those in FIG. 6 denote the same steps and a repetitive description thereof will be omitted.

In step S1024, the MTC-IWF 720 determines whether the unreached-device ID list of the same group message ID has already been generated. If the unreached-device ID list has already been generated, the MTC-IWF 720 updates the unreached-device ID list within the repetition count limit N in step S1025; otherwise, the MTC-IWF 720 generates a new unreached-device ID list in step S625.

According to this example embodiment, a message is delivered to a group of devices which a group message has not reached. Therefore, even if devices cannot receive the group message, it is possible to suppress an increase in number of control messages. Especially, it is possible to reduce the number of devices which the message has not reached by repeating the procedure of updating the group unreached-device ID list and redelivering the group message by the MTC-IWF.

Fourth Example Embodiment

A communication processing system including an MTC-IWF serving as a communication processing apparatus according to the fourth example embodiment of the present invention will be described next. The MTC-IWF serving as the communication processing apparatus according to this example embodiment is different from those according to the second and third example embodiments in that a reached-device ID list is generated and saved separately from an unreached-device ID list, and group messaging is executed using the reachable-device ID list for a subsequent group messaging request to the same MTC device group. That is, the MTC-IWF creates a group message reached group list together with a group message unreached group list. A subsequent group message is transmitted with respect to the group message reached group list. This can transmit the group message to only communicable MTC devices without transmitting the message to devices to which transmission is impossible since they are powered off.

<<Operation Sequence>>

Figure 11:
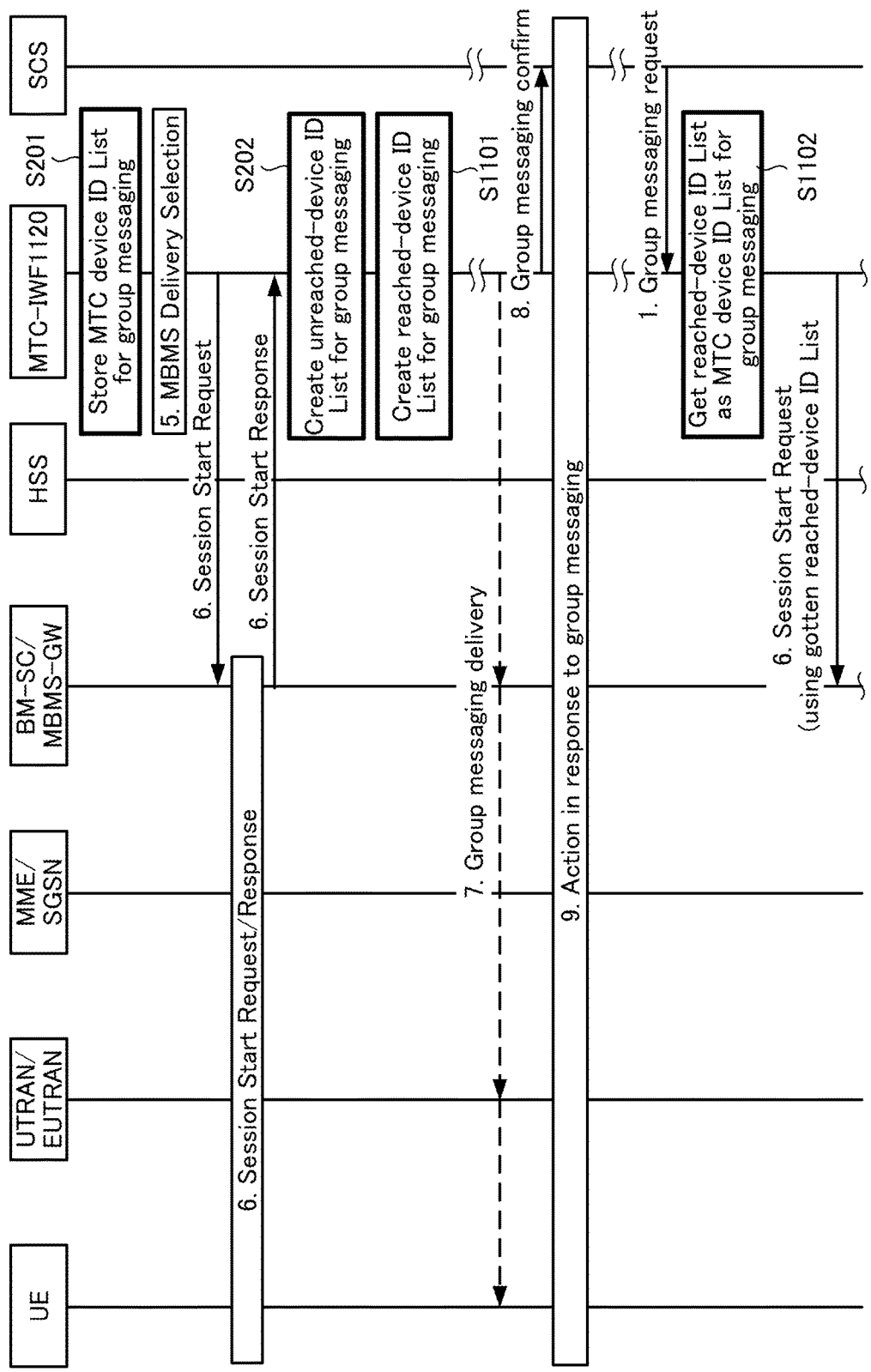
FIG. 11 is a sequence chart showing the operation of an MTC-IWF serving as a communication processing apparatus according to the fourth example embodiment of the present invention.

FIG. 11 is a sequence chart showing the operation of an MTC-IWF 1120 serving as the communication processing apparatus according to this example embodiment. Note that in FIG. 11, the same numbers as those in FIG. 2B of the technical premise indicate the same sequence operations, and a repetitive description thereof will be omitted. Furthermore, in FIG. 11, some sequence operations in FIG. 2A are eliminated to avoid cumbersomeness. In this example embodiment, changed or added sequence operations are added with step numbers, and will be described below.

Upon receiving a response message to the first session start processing, the MTC-IWF 1120 generates and saves, in step S1101, a reached-device ID list as a list of reached devices. Similarly to the unreached-device ID list, the second or subsequent update processing may be repeated.

If a group messaging request for the same device group is received from the SCS, the MTC-IWF 1120 starts, in step S1102, session start processing using the reached-device ID list saved in step S1101. In this case, it is possible to eliminate processing of acquiring information of an MTC device group from the HSS or the like, and processing of selecting the MBMS.

<<Functional Arrangement of MTC-IWF 1120>>

Figure 12:
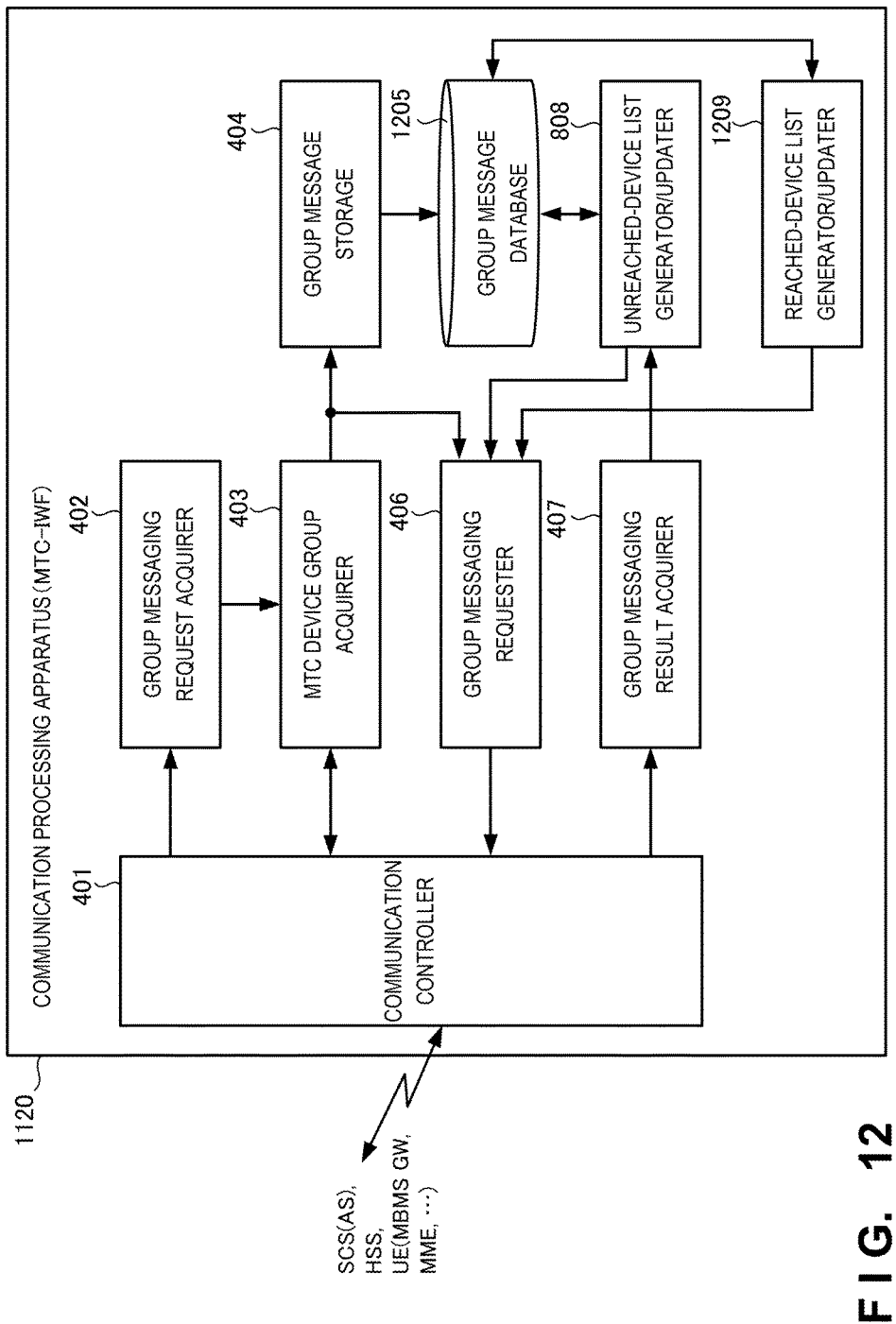
FIG. 12 is a block diagram showing the functional arrangement of the MTC-IWF serving as the communication processing apparatus according to the fourth example embodiment of the present invention.

FIG. 12 is a block diagram showing the functional arrangement of the MTC-IWF 1120 serving as the communication processing apparatus according to this example embodiment. Note that in FIG. 12, the same reference numerals as those in FIGS. 4 and 8 denote the same functional components and a repetitive description thereof will be omitted.

The MTC-IWF 1120 includes a group message database 1205 and a reached-device list generator/updater 1209. The group message database 1205 stores a reached-device ID list generated and updated by the reached-device list generator/updater 1209. The reached-device list generator/updater 1209 serves as a reached-device list generator and a reached-device list updater to generate a reached-device ID list based on the response message of the first session start processing and update the reached-device ID list based on the response message of the second or subsequent session start processing. Then, by a subsequent group messaging request, the reached-device list generator/updater 1209 requests, using the reached-device ID list, a group messaging requester 406 to perform session start processing or group message delivery.

Note that in FIG. 12, the reached-device list generator/updater 1209 is included in the MTC-IWF 1120. However, the reached-device list generator or reached-device list updater may be included in an external apparatus, and the reached-device list generator may serve as a reached-device list acquirer.

(Group Message Database)

FIG. 13 is a table showing the structure of the group message database 1205 according to this example embodiment. Note that in FIG. 13, the same reference numerals as those in FIG. 5 denote the same components and a repetitive description thereof will be omitted. Furthermore, the second and subsequent update processing results are not shown in FIG. 13 to avoid cumbersomeness.

The group message database 1205 stores, in association with an MTC device ID 502, a reached-device ID list 1304 of devices which the session start request has reached.

<<Processing Procedure by MTC-IWF>>

Figure 14:
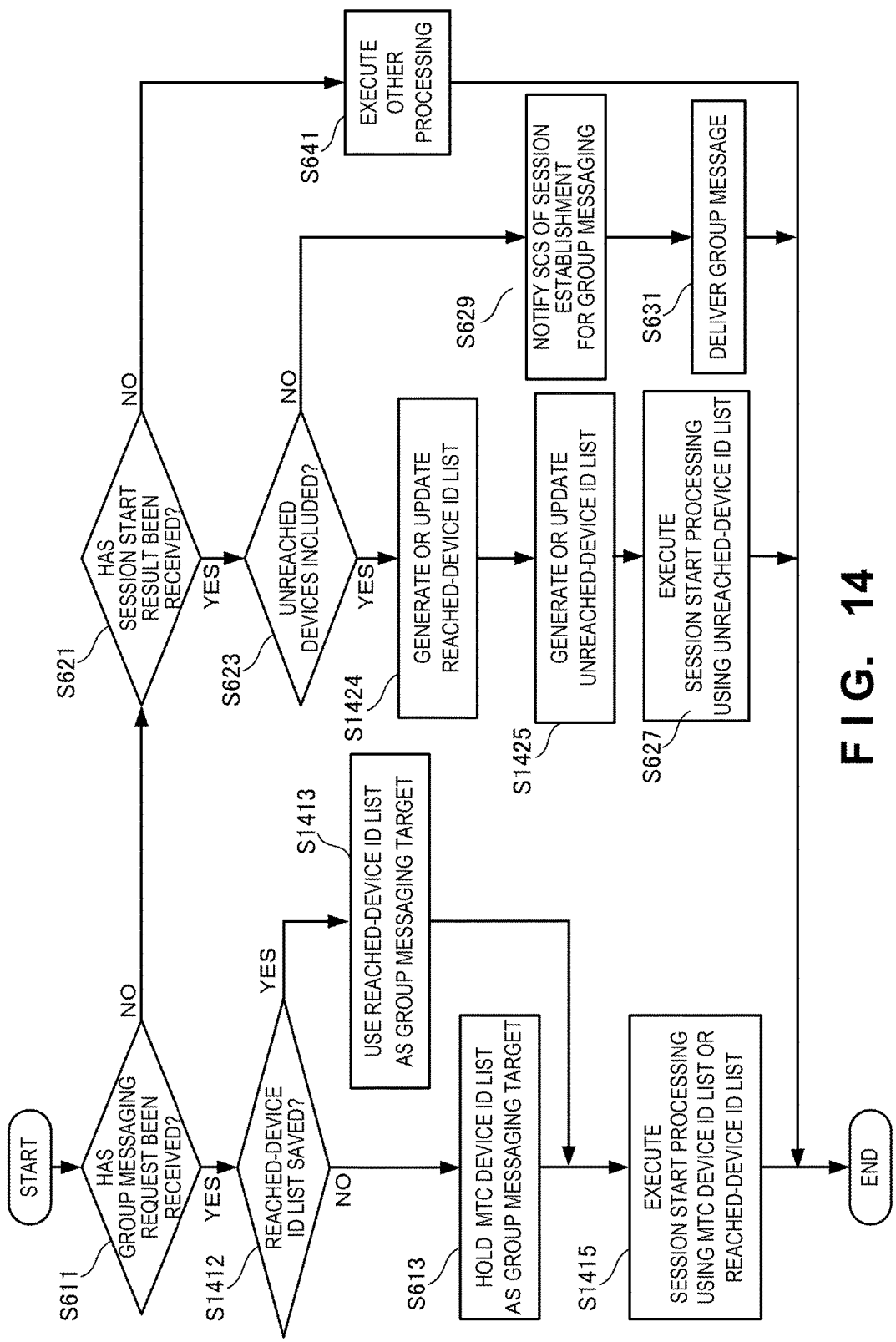
FIG. 14 is a flowchart illustrating a processing procedure by the MTC-IWF serving as the communication processing apparatus according to the fourth example embodiment of the present invention.

FIG. 14 is a flowchart illustrating a processing procedure by the MTC-IWF 1120 serving as the communication processing apparatus according to this example embodiment. Note that in FIG. 14, the same step numbers as those in FIGS. 6 and 10 denote the same steps and a repetitive description thereof will be omitted.

If a group messaging request for the same device group is received, the MTC-IWF 1120 determines in step S1412 whether or not a reached-device ID list is saved. If the reached-device ID list is saved, the MTC-IWF 1120 uses, in step S1413, the saved reached-device ID list as a target of the group messaging; otherwise, the MTC-IWF 1120 holds, in step S613, MTC device ID list acquired from the HSS or the like, as a target of the group messaging. In step S1415, the MTC-IWF 220 executes session start processing for the MTC device group of the MTC device ID list or reached-device ID list.

If it is determined in step S623 that there are unreached devices, the MTC-IWF 1120 generates or updates a reached-device ID list in step S1424, and generates or updates an unreached-device ID list in step S1425. Note that generation or update of the unreached-device ID list in step S1425 is processing including steps S1024, S1025, and S625 of FIG. 10. Generation or update of the reached-device ID list in step S1424 is similar to generation or update of the unreached-device ID list although not shown.

According to this example embodiment, since a message is delivered to a group of devices which a group message has not reached, even if devices cannot receive the group message, it is possible to suppress an increase in number of control messages. Especially, it is possible to create a group message reached group list, and deliver a subsequent group message for the group message reached group list. This can deliver the group message to only communicable MTC devices without delivering the message to devices to which delivery is impossible since they are powered off.

Other Example Embodiments

In the above example embodiments, the arrangement in which the MTC-IWF holds a device group to which a group message is to be delivered, generates an unreached-device group list or a reached-device group list based on responses to delivery of the group message, and delivers the message using the unreached-device group list or the reached-device group list has been explained. However, an arrangement for implementing such processing is not limited to the MTC-IWF. The processing of the example embodiments may be implemented by elements forming another core network or distributed to a plurality of components. For example, a component that generates an unreached-device group list or a reached-device group list and a component that acquires the unreached-device group list or the reached-device group list and delivers a group message based on the list may be included in different apparatuses. Furthermore, if the core network is implemented by a virtual network, further divided functions can be distributed, some of functions distributed to different components can be integrated, or some functions can be shared.

While the invention has been particularly shown and described with reference to example embodiments thereof, the invention is not limited to these example embodiments. It will be understood by those of ordinary skill in the art that various changes in form and details may be made therein without departing from the spirit and scope of the present invention as defined by the claims.

The present invention is applicable to a system including a plurality of devices or a single apparatus. The present invention is also applicable even when a control program for implementing the functions of example embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described example embodiments.

The invention claimed is:

1. A communication processing apparatus comprising:
a memory storing instructions; and
a processor configured to execute the instructions to:
   hold identifiers of a plurality of devices included in a device group as a target of a group messaging requested from an application;
   acquire an unreached-device list created by excluding, identifiers of devices which a group message has reached from the held identifiers, based on responses to delivery of the group message; and
   deliver a message based on the group messaging to devices having identifiers included in the unreached-device list.

2. The communication processing apparatus according to claim 1, wherein the processor is further configured to execute the instructions to:
   acquire, as a delivery result, information indicating whether or not the group message has reached each of the plurality of devices based on the responses to the delivery of the group message; and
   generate the unreached-device list based on the acquire delivery result.

3. The communication processing apparatus according to claim 2, wherein the processor is further configured to execute the instructions to update the unreached-device list by excluding identifiers of devices which the group message has reached from the identifiers in the unreached-device list, based on responses to the delivery of the group message to the devices having identifiers included in the unreached-device list.

4. The communication processing apparatus according to claim 3, wherein update of the unreached-device list is performed up to an upper limit value of a repetition count.

5. The communication processing apparatus according to claim 2, wherein the processor is further configured to execute the instructions to acquire and hold, as a reached-device list, a list of identifiers of devices which the group message has reached among the held identifiers.

6. The communication processing apparatus according to claim 5, wherein when a new device group as a target of a new group messaging requested from an application is same as the device group in the pre-requested group messaging, the target of the new group messaging is set as a group of the identifiers included in the reached-device list.

7. The communication processing apparatus according to claim 6, wherein the processor is further configured to execute the instructions to update the unreached-device list by excluding identifiers of devices which the group message has reached from the identifiers in the unreached-device list, and update the reached-device list by adding identifiers of devices which the group message has reached to the identifiers in the reached-device list, based on responses to the delivery of the group message to the devices having identifiers included in the unreached-device list.

8. The communication processing apparatus according to claim 5, wherein the processor is further configured to execute the instructions to update the unreached-device list by excluding identifiers of devices which the group message has reached from the identifiers in the unreached-device list, and update the reached-device list by adding identifiers of devices which the group message has reached to the identifiers in the reached-device list, based on responses to the delivery of the group message to the devices having identifiers included in the unreached-device list.

9. The communication processing apparatus according to claim 8, wherein update of the unreached-device list or update of the reached-device list is performed up to an upper limit value of a repetition count.

10. The communication processing apparatus according to claim 1, wherein the processor is further configured to execute the instructions to update the unreached-device list by excluding identifiers of devices which the group message has reached from the identifiers in the unreached-device list, based on responses to the delivery of the group message to the devices having identifiers included in the unreached-device list.

11. The communication processing apparatus according to claim 10, wherein update of the unreached-device list is performed up to an upper limit value of a repetition count.

12. The communication processing apparatus according to claim 1, wherein the processor is further configured to execute the instructions to acquire and hold, as a reached-device list, a list of identifiers of devices which the group message has reached among the held identifiers.

13. The communication processing apparatus according to claim 12, wherein when a new device group as a target of a new group messaging requested from an application is same as the device group in the pre-requested group messaging, the target of the new group messaging is set as a group of the identifiers included in the reached-device list.

14. The communication processing apparatus according to claim 13, the processor is configured to execute the instructions to update the reached-device list by adding identifiers of devices which the group message has reached to the identifiers in the reached-device list, based on responses to the delivery of the group message to the devices having identifiers included in the unreached-device list.

15. The communication processing apparatus according to claim 12, wherein the processor is further configured to execute the instructions to update the reached-device list by adding identifiers of devices which the group message has reached to the identifiers in the reached-device list, based on responses to the delivery of the group message to the devices having identifiers included in the unreached-device list.

16. The communication processing apparatus according to claim 15, wherein update of the reached-device list is performed up to an upper limit value of a repetition count.

17. The communication processing apparatus according to claim 1, wherein the communication processing apparatus is an apparatus corresponding to MTC-IWF (Machine Type Communication-Interworking Function) defined by 3GPP (Third Generation Partnership Project).

18. A non-transitory computer readable medium storing a program of controlling a communication processing apparatus for causing a computer to execute a method, comprising:
holding, in a holder, identifiers of a plurality of devices included in a device group as a target of a group messaging requested from an application;
acquiring an unreached-device list created by excluding identifiers of devices which a group message has reached from the identifiers held in the holder, based on responses to delivery of the group message; and
delivering a message based on the group messaging to devices having identifiers included in the unreached-device list.

19. A group message processing method comprising:
holding, in a holder, identifiers of a plurality of devices included in a device group as a target of a group messaging requested from an application;
acquiring a plurality of devices which a group message has reached based on responses of devices to delivery of the group message, and generating an unreached-device list by excluding the identifiers of the plurality of reached devices from the identifiers held in the holder; and
delivering a message based on the group messaging to devices having identifiers included in the unreached-device list.

* * * * *

UNITED STATES PATENT AND TRADEMARK OFFICE
CERTIFICATE OF CORRECTION

PATENT NO. : 10,455,371 B2
APPLICATION NO. : 15/762838
DATED : October 22, 2019
INVENTOR(S) : Kyoji Hirata et al.

Page 1 of 1

It is certified that error appears in the above-identified patent and that said Letters Patent is hereby corrected as shown below:

In the Claims

Column 14, Line 11; In Claim 14, after "processor is", insert --further--

Signed and Sealed this
Twenty-fourth Day of November, 2020

Andrei Iancu
*Director of the United States Patent and Trademark Office*